Dec. 22, 1942. E. R. BACKUS 2,305,594
ROLL MILL IMPACT EQUALIZER FOR FLEXIBLE COUPLINGS
Filed May 15, 1941
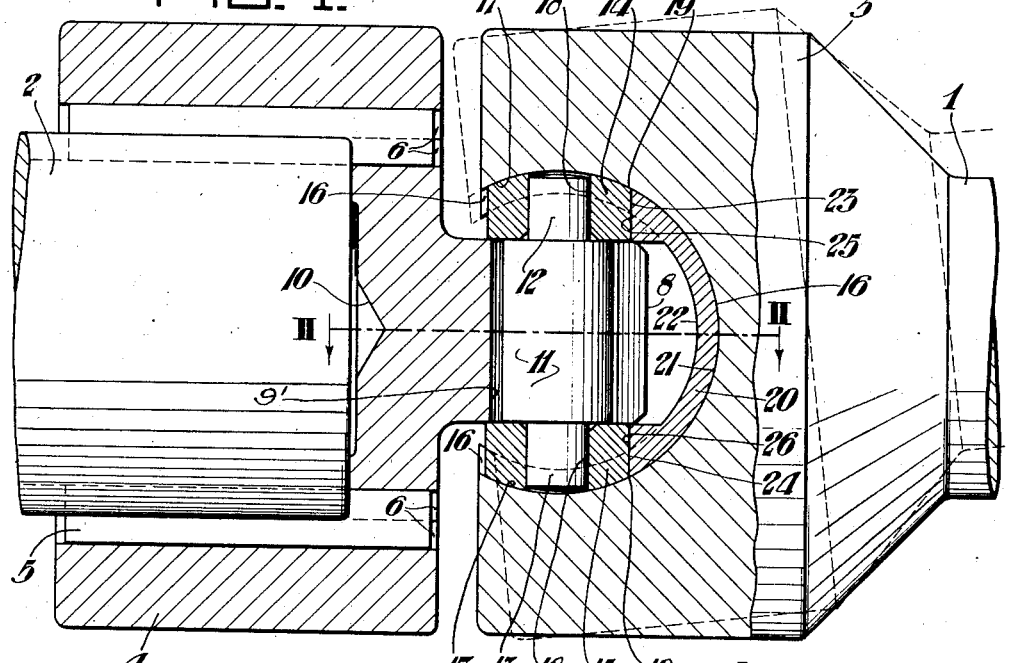
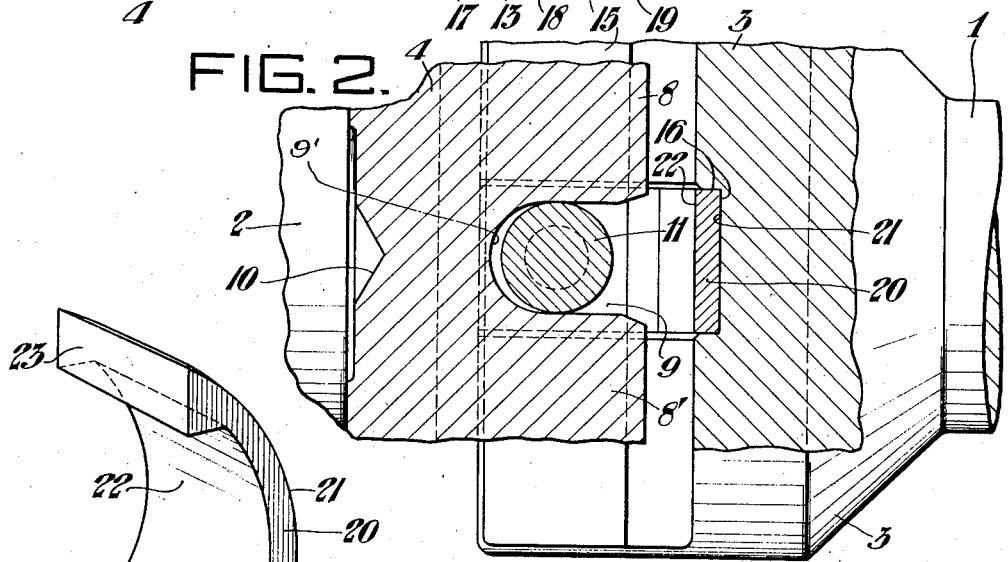
Inventor:
EARL R. BACKUS,
by: John E. Jackson
his Attorney.

Patented Dec. 22, 1942

2,305,594

UNITED STATES PATENT OFFICE 2,305,594

ROLL MILL IMPACT EQUALIZER FOR FLEXIBLE COUPLINGS

Earl R. Backus, Glassport, Pa.

Application May 15, 1941, Serial No. 393,616

7 Claims. (Cl. 64—7)

This invention relates generally to improvements in the construction of the driving spindle coupling adapted for use in cold reduction rolling mills, in which cold rolling mills the various parts of the coupling structure, and particularly the driving slippers, are subjected to excessive shocks and strains, due to the necessity of "bumping" the rolls into position, in such machines, for example, as the five-stand cold reduction mill. On occasions, the forces and strains from such bumping operations have been of such a severe and intensified character, when transmitted through the driving slippers (also sometimes known as spindle wobbler bearing segments) as to seriously damage or break such parts.

More particularly stated, this invention relates to the provision of means to minimize, if not eliminate, the likelihood of damage to or breakage of, the driving slippers in the driving spindle coupling, especially during such times as the rolls of the cold reduction mill are being placed in position, and are being subjected to a bumping operation.

In order to overcome the difficulties and objections of the prior art structures as above noted, it is an object of the present invention to provide an improved structure, requiring a minimum of change or alteration of present structures, but which will be effective to relieve the driving wobbler bearing segments from the intensified breaking or damaging strains heretofore encountered and so distribute the strains and stresses over a wider area to parts which can withstand such bumping forces without danger of damaging or breaking of such parts of the spindle drive coupling or other parts.

While it is true that in the design of power transmitting shafts, spindles or universal couplings, for rolling mills, such parts are usually of such strength as to serve as safety links and as such to break under operating strains somewhat less than those which would injure the rolls, (and for this reason such parts are sometimes known as breaking pieces) these parts should be of such design and arrangement as to withstand the initial intensified stresses from the bumping operation in assembling or placing the rolls in position for subsequent normal rolling mill operation.

In general, it may be stated that the above objects of the invention are obtained by providing a back-up block for the universal type of driving spindle coupling, so constructed, arranged, and disposed relative the related parts of the coupling that the endwise force from the roll-bumping operation is received by a central portion of the spindle or center pin and is transmitted through the central portion of the wobbler bearing segments or slippers at the opposite ends of the pin, directly to opposite ends of a back-up block shown as of arcuate or arch-like form, so that any force or stress received at the arcuate ends is substantially uniformly distributed to the main spindle housing throughout the entire arch-like area of bearing contact or support of the back-up block with and in the spindle drive housing. Such an arrangement permits of a limited rotary sliding, oscillating movement between the parts of the coupling in the event of any slight angular difference between the axis of the power drive housing and the axis of the roller housing. The back-up block also serves to effect distribution of the normal driving stresses at the coupling parts over a wider area of bearing contact, and thus serves also to reduce intensified wearing stresses during normal operation and favors longer useful life of the various parts of the coupling.

One selected embodiment is shown in the accompanying drawing for purposes of illustration.

In the drawing:

Figure 1 is a broken elevation of a coupling showing the roll housing, part of the drive spindle housing and assembled parts therein, in section, the neck or end bearing portion of the roll keyed in the roll housing, and the spindle of the coupling within the drive housing being shown in elevation, the dotted line position of the housing of the drive spindle representing a relative position when the axes of the driving and driven housings are not in alignment, but are inclined at a slight angle to each other;

Figure 2 is a broken section taken on the line and looking in the direction of the arrows II—II of Figure 1; and Figure 3 is an enlarged perspective of the back-up block.

As shown in the drawing, the flexible drive coupling between a power drive shaft or spindle 1 and a driven roll 2 includes a power spindle housing 3 and a driven roll end housing 4. The neck or end portion of the roll 2 is shown secured in the roll housing 4 by splines 5 disposed in keyways 6 on diametrically opposite sides of the neck of the roll 2.

A driving connection, flexible in character, is provided between the driving housing 3 and driven housing 4. As shown, the housing 4 is provided at one end 7 with a pair of spaced driving lugs or ears 8, 8', which extend radially outward in diametrical alignment from the centrally disposed spindle-receiving slotted recess 9 open at one end and centrally disposed with respect to the axis 10 of the roll housing 4.

The recess 9 snugly receives a spindle 11 between the walls thereof and the axis of the spindle 11 passes through the axis of the roll housing 4, said spindle axis being normal thereto during the usual operation when the axes of the two housings 3, 4 are in alignment. Movement of the spindle 11 in the slotted recess 9 is stopped a slight distance from the bottom 9' of the recess in order to permit of a slight angular movement and disposition of the axis of spindle 11 relative the axis of the housing 4, in the event that the axis of driving power housing 3 is at a slight angle to the axis of the roll housing 4. The open-ended slotted recess 9 would also permit of a slight relative axial movement or separation of respective housings and still retain a driving relation between the housings. Such relative angular or axial movement between the roll housing 4 and the driving housing 3 may result if the roller 2 is adjusted to different positions.

The spindle 11 is supported and arranged relative the driving spindle shaft 1 and the housing 3, so that the housing 3 may have, within certain limits of angular displacement of the axes of the respective housings 3, 4, what might be called a universal movement. This is effected by providing a flexible connection, the characterizing feature of which is that it permits free rotary movement of the axis of the shaft 1 or housing 3 in any one of two planes which are normal to each other, the center of rotation being at the intersection of the two planes, centrally of the spindle, such, for example, as a vertical plane and also a horizontal plane.

Relative rotary movement of the axis of the power drive housing 3 in a horizontal plane about a center of rotation in the spindle is provided by so mounting the spindle 11 in the housing 3 that the housing 3 may be rotated about the vertical axis of the spindle 11. For this purpose the necked or reduced bearing ends 12, 13 of the spindle 11 are rotatably supported in driving slipper or wobbler segments 14, 15. These slipper segments are, in turn, so mounted in the power drive housing 3 that the said housing and its axis may be rotated about the spindle 11 in a vertical plane. For this purpose, there is formed in the housing 3, in the wall of an aperture, a recess 16 of cylindrical segmental form. One side 17 of each of the slippers 14, 15 is shaped to correspond with, and have an arcuate bearing surface corresponding in form to, that of the cylindrical segmented recess 16.

From the construction thus far described, it is clear that in the event of a sudden axial blow or force along the axis 10 of the roll housing 4, caused by a sudden bumping of the roll 2 by an axial blow toward the right, that the full force of such bumping would be transmitted axially through the lugs 8, 8' to the spindle 11 and from the spindle at its end bearings 12, 13, to the portion of the slipper or wobbler segments 14, 15 interposed between one side 18 of the spindle necks 12, 13 and the area of contact where the arcuate surface of the slipper segment contacts or engages the surface of the arcuate recess 16. This area of contact is in substantially the same plane and same direction as the transmitted bumping force, so that substantially the entire impact force from the bumping will be concentrated on and within a restricted area, or almost line of contact, such, for example, as indicated at 19. As heretofore indicated, these concentrated bumping forces were, on occasions, sufficient to break or damage the slipper segments 14, 15. If such parts were not broken or damaged, it is clear from the above analysis that the forces along the line of contact, or adjacent the area 19 at the corner or edge of the slippers, with curved bearing face of the recess 16, are so intensified and concentrated that such bearing surface is likely to be scored or damaged so as to seriously impair, if not render impossible, further free sliding movement of the slippers 14, 15 within the cylindrical recess 16, and thus interfere with the universal free coordinated flexible drive of the coupling, particularly where the axes of the couplings 3, 4 are at a slight angle.

In order to overcome the objections above referred to without requiring any substantial change in construction or arrangement of the main functioning parts, a means is provided of eliminating the deleterious effect of the highly concentrated bumping forces and stresses, by distributing them over a relatively wide area. The means employed not only is effective to overcome the problems and difficulties encountered under the special or particular conditions of bumping the roll, but functions during normal driving operations to balance and equalize the forces and stresses between the two slipper segments 14, 15 and to normally distribute the forces over a wider area of frictional contact, and thus minimize the wear factor and contribute to increase of normal functioning life of the various parts of the flexible coupling, and particularly the slipper or wobbler segments.

In the preferred form shown in the drawing, the forces or strains, due to an axial bumping of the roll, or due to the normal operating, axial and torsional forces, are distributed over a relatively large area by employing a pressure equalizer or distributing means or member, designated generally as a back-up block 20. This member is shown in enlarged form in Figure 3. The back-up block is shown as being of arched or arcuate form in its outer and inner contour 21, 22, respectively, which corresponds generally with the arcuate contour of the recess 16. The arched pressure distributing block 20 lies within the arcuate recess 16 and the ends 23, 24 abut against the inner sides 25, 26 of the slipper or wobbler segments 14, 15, respectively. The back-up block 20, which might also be called a pressure equalizer or distributing member, when in position, does not impair or interfere with the flexible character of the coupling, and still permits free rotation of the drive housing 3, and the coupling parts, when the axes of the housings 3, 4 are at an angle, in a manner heretofore pointed out.

The pressure equalizer and distributor 20 may be made of steel, cast iron, bronze, or other suitable composition, as desired. Such member is installed in position in the drive housing 3 of the spindle coupling when the slippers 14, 15 are assembled. The groove-like character of the recess 16 in the wall of the cylindrical segmental recess in the spindle coupling, serves to perform a locking function which restrains the slipper or wobbler segments 14, 15 against endwise movement, and also holds the back-up block 20 in position.

While one preferred form has been shown and described for the purposes of illustration, various changes and modifications may be made by those skilled in the art without departing from the spirit and scope of this invention as hereinafter claimed.

I claim:

1. A flexible coupling adapted for driving a roller in a rolling mill including a drive housing, a flexible coupling therein including a plurality of slippers, a driven roll housing, driven through said flexible coupling, a roll adapted to be mounted in said roll housing by an axial bumping impact thrust which is transmitted to the drive housing through the slippers of the flexible coupling, a pressure equalizer and distributing member, mounted in said drive housing, said pressure equalizer and distributing member including a back-up member of a generally arched form disposed between the slippers and movable therewith during normal driving operation in an arcuate path with its ends abutting said slipper segments whereby the forces concentrated on the slippers are distributed by the back-up block throughout the relatively large area of the normally movable arched portion thereof to the drive housing.

2. A flexible coupling adapted for driving a roller in a rolling mill including a drive housing, a flexible coupling therein including a plurality of slippers, a driven roll housing, driven through said flexible coupling, a roll having one end positioned in said roll housing by an axial bumping impact thrust which is transmitted to the drive housing through the slippers of the flexible coupling, a pressure equalizer and distributing member mounted in said drive housing and adapted to prevent injury or damage to the flexible coupling parts as a result of any concentrated axial bumping thrust transmitted thereto from bumping of the roll axially of the roll housing, said pressure equalizer and distributing member being disposed between and normally movable with said slippers and including a back-up member of a generally arched form, the ends of the arch being so disposed as to abut against the central portion of the slippers of the flexible coupling to prevent damage or breakage to the slippers by the axial bumping thrust.

3. A flexible coupling adapted for driving a roller in a rolling mill including a drive housing, a flexible coupling therein, a driven roll housing, a roll adapted to be mounted in said roll housing by an axial bumping impact thrust, a pressure equalizer and distributing member, said flexible coupling including coupling means arranged to permit driving relation when the axis of the two housings are at an angle to each other, said coupling means including a plurality of slipper segments, a spindle having its axis normal to the drive housing axis and having its ends mounted in said slipper segments, a cylindrical segmental aperture formed within said drive housing and an arcuate recess in the wall thereof having its axis normal to the axis of the housing and normal to the axis of the spindle, said slipper segments being slidably guided in the recess in the wall of the aperture, said pressure equalizer and distributor being slidably mounted in said recess and disposed between said slipper segments with its ends abutting said slipper segments, whereby any bumping force received by said spindle axially of the roll housing is transmitted through said slipper segments to said drive housing through the relatively large area of contact of the back-up block therewith.

4. A flexible coupling adapted for driving a roller in a rolling mill including a drive housing, a flexible coupling therein including a plurality of slippers, a driven roll housing, a roll adapted to be mounted in said roll housing, a pressure equalizer and distributing member mounted in said drive housing and adapted to prevent injury or damage to the flexible coupling parts as a result of any concentrated axial bumping thrust transmitted thereto from bumping of the roll axially of the roll housing, a cylindrical segmental aperture formed within said drive housing and an arcuate grooved recess in the wall thereof having its axis normal to the axis of the housing, said pressure equalizer and distributor being slidably mounted in said recess with its ends abutting said slipper segments, whereby the forces concentrated on the coupling parts are distributed by the back-up block throughout the relatively large area of the arched portion thereof to the drive housing.

5. A flexible coupling adapted for driving a roller in a rolling mill including a drive housing, a flexible coupling therein, a driven roll housing, a roll adapted to be mounted in said roll housing by an axial bumping impact thrust, a pressure equalizer and distributing member mounted in said drive housing and adapted to prevent injury or damage to the flexible coupling parts as a result of any concentrated axial bumping thrust transmitted thereto from bumping of the roll axially of the roll housing, coupling means arranged to permit driving relation when the axes of the two housings are at an angle to each other, said coupling means including a plurality of slipper segments, a spindle having its axis normal to the drive housing axis, and having its ends mounted in said slipper segments, a cylindrical segmental aperture formed within said drive housing and a groove-like recess in the wall thereof, said slipper segments being slidably guided in said recess in the wall of the aperture, said pressure equalizer and distributor being slidably mounted in said recess and disposed between said slipper segments with its ends abutting said slipper segments, whereby any bumping force received by said spindle is transmitted through said slipper segments to said drive housing through the relatively large area of contact of the back-up block therewith, said driven roll housing including spaced lugs at one end thereof spanning said spindle and extending between said slipper segments in power driving relation to said slipper segments and extending within the segmental cylindrical aperture of the drive housing.

6. A back-up member for use with a pair of spaced slippers in a universal coupling having an internal arcuate bearing recess containing portions of the slippers, said member comprising an arcuate body having an external arcuate bearing surface formed to be complementary to said internal recess between the slipper portions, and having spaced terminal abutments spaced to engage the said portions of the spaced slippers and bear against the latter upon assembly therewith in said internal recess.

7. A back-up member for use with a pair of spaced slippers in a universal coupling having an internal arcuate bearing recess containing portions of the slippers, said member comprising an arcuate body having an external arcuate bearing surface formed to be complementary to said internal recess between the slipper portions, and having spaced terminal abutments spaced to engage the said portions of the spaced slippers and bear against the latter upon assembly therewith in said internal recess, the abutments being disposed in a plane positioned intermediate the center of curvature of the external bearing surface and said surface.

EARL R. BACKUS.